Feb. 13, 1923.

M. D. SWEET.
BATTERY CHARGING CONNECTOR
FILED MAY 26, 1921.

1,445,567.

Inventor
Meachem D. Sweet
By Freese, Merkel, Saywell and Bond
Attorneys

Patented Feb. 13, 1923.

1,445,567

UNITED STATES PATENT OFFICE.

MEACHEM D. SWEET, OF ALLIANCE, OHIO.

BATTERY-CHARGING CONNECTOR.

Application filed May 26, 1921. Serial No. 472,724.

*To all whom it may concern:*

Be it known that I, MEACHEM D. SWEET, a citizen of the United States, residing at Alliance, in the county of Stark and State of Ohio, have invented a new and useful Battery-Charging Connector, of which the following is a specification.

This invention relates to battery charging connectors such as are used upon the terminals of charging cords, and has for its object the provision of a connector which will assure a positive connection between the charging cord and the battery terminal, springs being eliminated from the construction, as the usual spring clips which are in common use for this purpose soon become corroded from the acids in the batteries, taking the life from the spring and causing loose connections between the charging cord and the battery terminal, often causing arcs which are dangerous, as explosions sometimes occur from the gas in the battery becoming ignited by a spark.

The usual form of connector or clip for connecting the charging cord to the battery terminal for recharging the battery is either formed of spring metal or provided with a spring for gripping the terminal, serrated jaws being generally provided upon the clip or connector. As the acid frequently leaks from the batteries and comes into contact with these connectors, the teeth are soon eaten from the clamping jaws of the connectors and the springs become corroded and lose their resiliency, thus preventing the connectors from tightly gripping the battery terminals, causing an arc.

With this object in view, the invention consists in the construction and arrangement of parts hereinafter described and illustrated in the accompanying drawings, it being understood that various changes in the form and details of construction may be made within the scope of the appended claims.

The invention thus set forth in general terms is illustrated in the accompanying drawings, in which—

Figure 1:
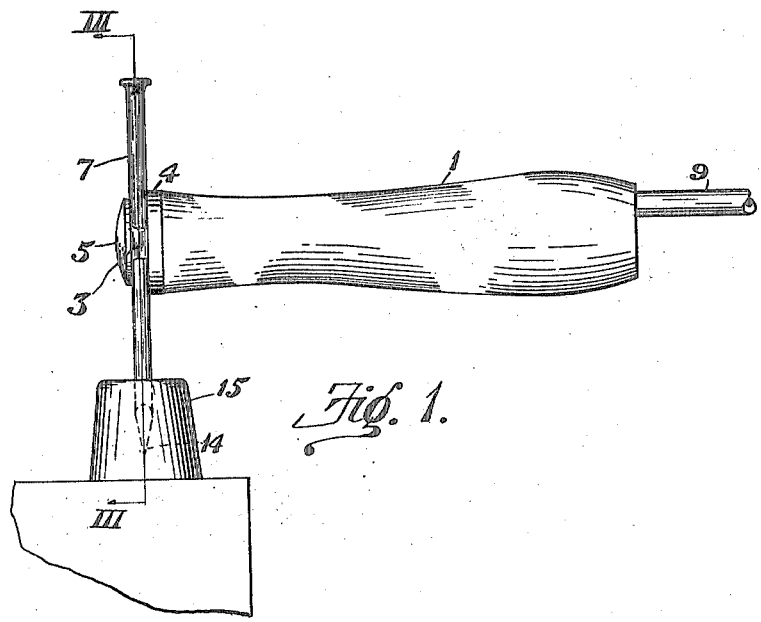
Figure 2:
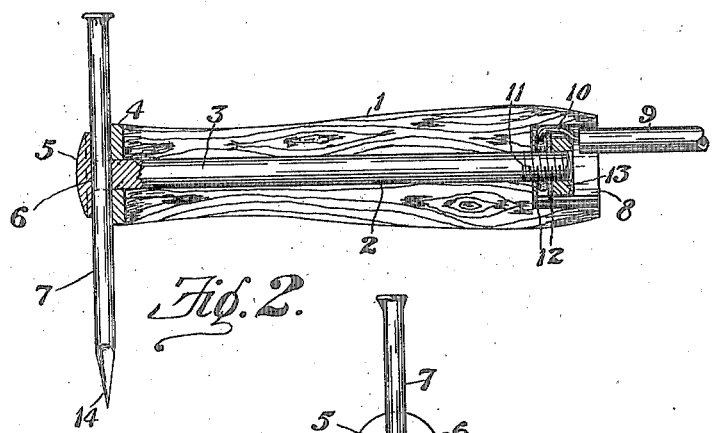

Figure 1 is a side elevation of the device showing the same connected to the terminal of a battery;

Fig. 2, a longitudinal, sectional view through the device; and

Figure 3:
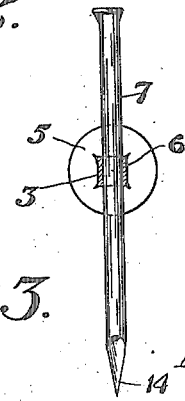

Fig. 3, a section on the line III—III, Fig. 1.

Similar numerals of reference indicate corresponding parts throughout the several views.

The device includes the hollow wooden handle 1 provided with the central bore 2 through which is located the bolt 3, a washer 4 being located around said bolt and bearing against the extremity of the handle.

The bolt 3 is provided near the head 5 with a transverse bore 6 through which an ordinary nail 7 is located. The opposite end of the handle is provided with the chamber 8 communicating with the central bore 2 and provided for the purpose of connecting the charging cord 9 to the bolt 3 in such a manner that the connection will be insulated. The wire 10 of the charging cord is connected to the threaded extremity 11 of the bolt, washers 12 being located upon each side of said wire, the nut 13 engaging the threaded extremity of the bolt within the chamber 8.

By tightening the nut 13, the wire 10 is clamped securely upon the bolt 3, while at the same time the nail 7 is clamped securely between the head of the bolt and the washer 4, the whole device being easily and readily assembled or knocked down by the operation of the nut.

When it is desired to attach the connector to the battery for the purpose of charging the same, the sharpened point 14 of the nail is placed upon the top of the battery terminal 15 and the nail is driven into the end of the terminal as shown in Fig. 1.

In attaching the connector to the battery terminal or removing the same therefrom, the wooden handle 1 may be grasped by the operator with no danger of a shock, as the device is thoroughly insulated. As there are no springs connected with the device or no clamping jaws such as are provided in the usual form of connector, the connector will not be materially damaged by the action of the acid from the batteries. The occasional sharpening of the pointed extremity 14 of the nail keeps the device in condition for use, and as the nail is driven firmly into the lead terminal of the battery, a positive connection is always assured, obviating any danger of an arc and thus preventing the possibility of explosions.

Although the drawings and above specification disclose the best mode in which I have contemplated embodying my invention, I desire to be not limited to the details of such disclosure, for, in the further practical application of my invention, many changes in form and construction may be made, as circumstances require or experience suggests, without departing from the spirit of the invention, within the scope of the appended claims.

I claim:—

1. A battery charging connector comprising an insulated handle, a bolt located through said handle, a nail located through one end of the bolt and means at the other end of the bolt for connecting the charging wire thereto.

2. A battery charging connector including an insulated handle having a central bore and a chamber in one end communicating with said bore, a bolt located within said bore and having a transverse opening through one end portion, a nail located through said opening, a charging wire connected to the bolt within said chamber and a nut upon the bolt within the chamber for clamping the charging wire upon the bolt and clamping the nail within the bolt.

In testimony that I claim the above, I have hereunto subscribed my name.

MEACHEM D. SWEET.